March 1, 1966 G. ARTHUR 3,237,293
MANUFACTURE OF CERMETS WITH METAL MEMBERS BONDED THERETO
Filed April 30, 1962
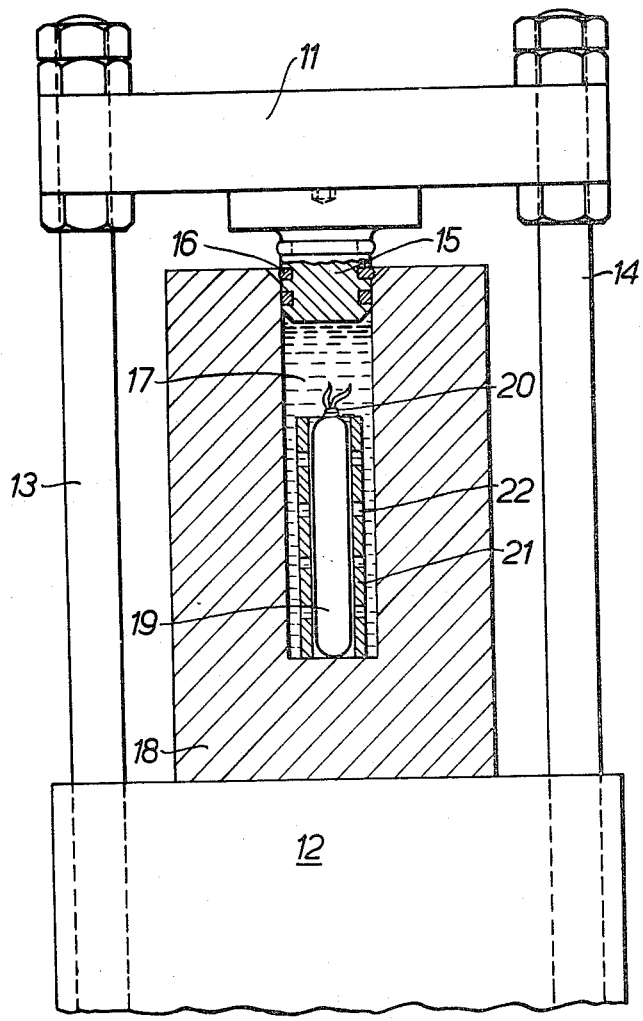

United States Patent Office 3,237,293
Patented Mar. 1, 1966

3,237,293
MANUFACTURE OF CERMETS WITH METAL MEMBERS BONDED THERETO
George Arthur, Denton, Newcastle upon Tyne, England, assignor to United Kingdom Atomic Energy Authority, London, England
Filed Apr. 30, 1962, Ser. No. 190,981
Claims priority, application Great Britain, May 1, 1961, 15,768/61
4 Claims. (Cl. 29—420.5)

This invention relates to the manufacture of bodies having a core formed of a cermet, that is a ceramic metal mixture, the core being enclosed in and bonded to a metal container.

The invention is particularly though not exclusively applicable to the manufacture of nuclear reactor fuel elements of the kind in which a cermet fuel rod comprises a ceramic nuclear fuel, for example uranium dioxide, in a metal matrix, for example of stainless steel, and the fuel rod is in turn enclosed and bonded to a metallic container of, for example, stainless steel.

According to the present invention, a body comprising a cermet core with an enclosing metal container bonded thereto is formed by a method including the steps of pressing mixed ceramic and metal powders into a compacted mass, coating with metal powder and an adhesive liquid those surfaces of the compacted mass that are to be bonded to the metal container, sintering the coated mass at a temperature below that at which any melting would take place, inserting the sintered mass in the metal container, and hot swaging the assembly of sintered mass and metal container at a temperature in the range 700° C. up to a temperature not exceeding a valve at which melting takes place so as to bond the metal container to the sintered mass. Besides effecting the bond, the swaging operation brings about a reduction of section accompanied by densification of the mass constituting the cermet core; this operation is chosen in preference to rolling or extruding to avoid the tendency of these alternatives to cause stringering of the ceramic powder particles in the metal matrix. By carrying out the swaging hot it is found that less fragmentation of the ceramic powder particles occurs than under cold conditions.

One way of coating the compacted mass is to wet it with the liquid and then bring the surfaces concerned into contact with a bed of the metal powder. With a cylindrically shaped mass, for example, it is conveniently dipped in the liquid and then rolled in the metal powder bed.

The invention is of particular application where the proportion of ceramic component in the cermet core is so high as to be in much the same region in terms of volume as the metal component. In such cases, the bond strength is likely to gain by pressing the coated mass before sintering by means of fluid pressure acting on a sealed flexible container housing the mass, this manner of pressing being adopted to minimize surface disturbance of the mass.

More specifically for cermet cores with a high proportion of the ceramic component, the method of the invention includes the steps of pressing mixed ceramic and metal powders into a compacted mass by means of fluid pressure acting on a sealed flexible container housing the mixture, dipping the compacted mass after pressing in a suspension of metal powder in an adhesive liquid to form a coating on the surfaces of the mass, allowing the coating to dry, re-pressing the coated mass by fluid pressure as above, followed by sintering of the said mass at a temperature below that at which any melting would take place, inserting the sintered mass in the metal container and hot swaging the assembly of sintered mass and metal container at a temperature in the range 700° C. up to a temperature not exceeding a value at which melting take place so as to bond the metal container to the sintered mass. Using the step of pressing by fluid pressure to compact the mixture makes possible a less demanding specification as to the shape of the ceramic powder particles than if the alternative of pressing with a plunger in a die were to be used. Thus good bonds have been obtained despite irregularity of the particles shape.

The sintering is preferably carried out in a reducing atmosphere such as dry hydrogen or carbon monoxide to prevent the formation of and remove existing oxide films on the metal powder. In one form where the metal powder is made from a ferrous metal the use of dry hydrogen is preferable to prevent any carburizing of the metal.

The invention also comprises a method of manufacturing a nuclear reactor fuel element substantially as described below.

In carrying the invention into effect in one form, here described by way of example, a clad nuclear reactor fuel element of cylindrical shape is formed by first hydrostatically pressing a mixture of uranium dioxide powder and pre-alloyed stainless steel powder in approximately equal quantities by volume. The stainless steel is an austenitic type of the 18/8 variety, namely a steel containing in the region of 18% chromium and 8% nickel by weight.

The hydrostatic pressing may be carried out with the apparatus shown diagrammatically by way of example in the accompanying drawing. Basically this apparatus is a press having upper and lower platens 11 and 12 respectively, the latter being slidable on fixed positioning bars 13 and 14 for the application of pressure. On the underside of the upper platen 11, which is fixed to the positioning bars, is an inverted plunger 15 with sealing rings 16 which is aligned vertically with a cylindrical cavity 17 in a die body 18 supported on the lower platen 12.

Employing this apparatus, the mixture of uranium dioxide and stainless steel is placed in a rubber bag indicated 19 which is then sealed as indicated at 20. The filled bag is introduced into a copper sleeve 21 perforated with holes 22, such sleeve serving as a former to retain approximately the desired shape of the mixed mass. Together with the sleeve, the filled bag is immersed in oil in the cylindrical cavity 17 and by causing entry of the plunger 15 into the cavity by upward movement of the lower platent the pressure of the oil is increased to a value of the order of 20 tons per square inch.

The compacted mass of uranium dioxide and stainless steel is then removed from the press and the rubber bag and is dipped into a suspension of pre-alloyed stainless steel powder in an adhesive liquid so that a coating approximately 0.003" thick covers the whole surface of the mass. In a case such as this where the bond metal is an alloy, the pre-alloyed condition is to be understood wherever there is reference to this metal in this specification. The adhesive liquid is conveniently of an organic character and should be removable by subsequent heating, examples are a polybutylmethacrylate resin or an epoxy resin. The coated mass is allowed to dry and is then placed again in the rubber bag and re-pressed hydrostatically in the manner described above up to 20 tons per square inch.

The coated mass is then removed from the press and the rubber bag sintered at 1350° C. in dry hydrogen.

After sintering the mass is then placed in a cleaned degreased container of stainless steel which subsequently is evacuated and sealed. The assembly of sintered mass and metal container is then subject to a hot rotary swaging operation.

The swaging apparatus is of standard form comprising two rotatable dies with concavities in their opposed faces to hold the assembly. In operation, the dies whilst rotating move towards one another repeatedly at intervals by impact with spaced rollers. The assembly is heated concurrently to a temperature in the region between 1000 and 1200° C. in a hydrogen atmosphere to minimize oxidation of the container and swaging begun at this temperature is continued with the temperature dropping to a value in the range 700 to 900° C.

The dies are then replaced with smaller dies, the assembly reheated to the same temperature between 1000 and 1200° C. and swaging then continued as before. This process is repeated until the final size required for the assembly is reached.

In its final form the assembly of coated mass and container constitutes a fuel element having a cermet core of uranium dioxide and stainless steel with an enclosing container of stainless steel firmly bonded thereto.

Whilst in the above example the fabrication and bonding of a uranium dioxide-stainless steel cermet and a stainless steel container is described, the invention is not limited to this application and can be applied to other metal-clad cermet cores in which the metals can be pressure bonded. Again, in the above example the bond metal coating, the metal container and the matrix metal in the cermet are all of the same type of stainless steel, but this is not essential, and in fact dissimilar metals would be suitable in certain cases; for example, the bond metal could be nickel with stainless steel for the matrix and container.

Further, whilst the materials were pressed using liquid pressure, gas pressure may also be used.

The pressure used, namely 20 tons per square inch, is not critical and lower or higher pressures may be used. The minimum value of pressure is that necessary to enable the compacted mass to be handled without breaking.

The sintering temperature will depend on the material being used, but generally speaking the range would be from about 700° C. upwards provided that the temperature does not exceed a value where melting takes place.

The swaging apparatus is of conventional form and the invention is not limited to the type described herein.

I claim:

1. A method of forming a body comprising a cermet core with an enclosing metal container bonded thereto, which method includes the steps of pressing mixed ceramic and metal powders into a compacted mass, using an adhesive liquid to cause a coating of metal powder to adhere to those surfaces of the compacted mass that are to be bonded to the metal container, sintering the coated mass at a temperature below that at which any melting would take place, inserting the sintered mass in the metal container, and hot swaging the assembly of sintered mass and metal container at a temperature in the range 700° C. up to a temperature not exceeding a value at which melting takes place so as to bond the metal container to the sintered mass.

2. A method according to claim 1, in which the mass is coated by wetting it with the liquid and then bringing it into contact with a bed of the metal powder.

3. A method of forming a body comprising a cermet core with an enclosing metal container bonded thereto, which method includes the steps of pressing mixed ceramic and metal powders into a compacted mass by means of fluid pressure acting on a sealed flexible container housing the mixture, dipping the compacted mass after pressing in a suspension of metal powder in an adhesive liquid to form a coating on the surfaces of the mass, allowing the coating to dry, repressing the coated mass by fluid pressure as above, folowed by sintering of the said mass at a temperature below that at which any melting would take place, inserting the sintered mass in the metal container and hot swaging the assembly of sintered mass and metal container at a temeprature in the range 700° C. up to a temperature not exceeding a value at which melting takes place so as to bond the metal container to the sintered mass.

4. A method according to claim 3, in which the ceramic powder is a nuclear fuel, the metal powder for both the mixture and the coating is stainless steel, and the metal container is also of stainless steel.

References Cited by the Examiner

UNITED STATES PATENTS

| | | | |
|---|---|---|---|
| 2,878,140 | 3/1959 | Barr | 75—208 |
| 2,979,400 | 4/1961 | Mouwen | 75—222 |
| 3,004,907 | 10/1961 | Precht et al. | |
| 3,019,176 | 1/1962 | McReynolds | 75—201 |
| 3,028,326 | 4/1962 | Brand et al. | |

JOHN F. CAMPBELL, *Primary Examiner.*

OSCAR R. VERTIZ, R. W. MACDONALD,
*Assistant Examiners.*